May 24, 1955  B. E. DIXSON  2,709,244
FLEXIBLE LEADS FOR GYROS
Filed June 17, 1949  2 Sheets-Sheet 1

INVENTOR:
BRUCE E. DIXSON
BY
Herbert E. Metcalf
Attorney

May 24, 1955  B. E. DIXSON  2,709,244
FLEXIBLE LEADS FOR GYROS
Filed June 17, 1949  2 Sheets-Sheet 2
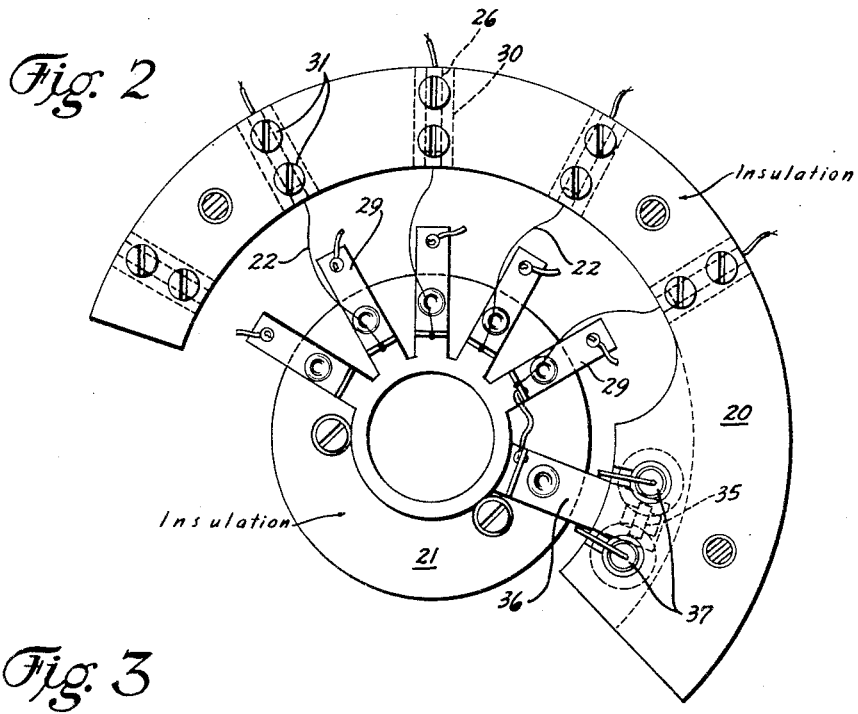
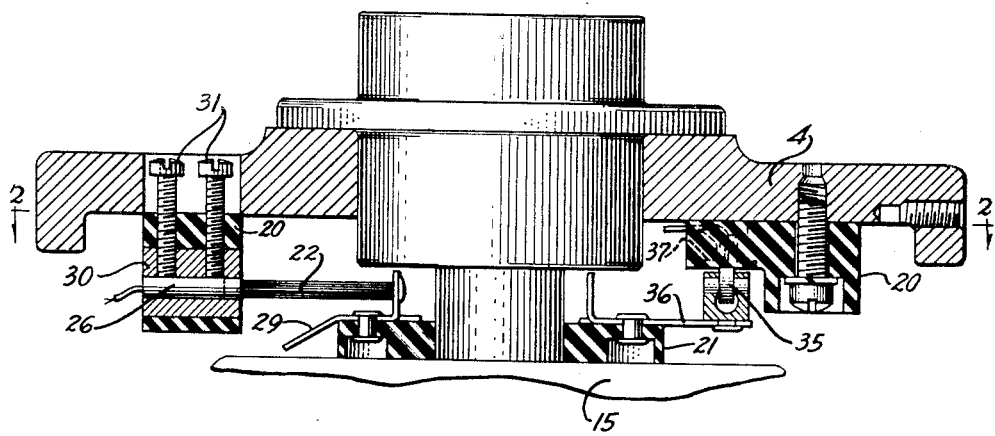
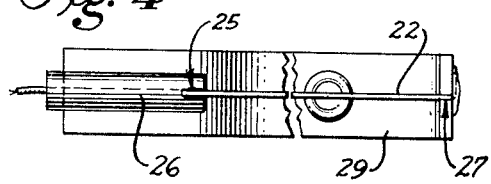
INVENTOR:
BRUCE E. DIXSON
BY
Herbert E. Metcalf
Attorney United States Patent Office 2,709,244
Patented May 24, 1955

2,709,244

FLEXIBLE LEADS FOR GYROS

Bruce E. Dixson, Hawthorne, Calif., assignor to Northrop Aircraft, Inc., Hawthorne, Calif., a corporation of California Application June 17, 1949, Serial No. 99,654

4 Claims. (Cl. 339—2)

The present invention relates to flexible power leads, and more particularly to a flexible lead between two moving elements imparting minimum resistance to relative movement therebetween even when the effective cross section required for electrical conduction is large.

In the mounting of gyroscopes in which the rotating mass is driven by an electric motor, it is customary to utilize one or more gimbals or similar devices to provide one or more degrees of freedom for the gyro. Consequently, it is necessary that the power required for driving the gyro rotor be transmitted across one or more bearings between relatively movable elements, and flexible leads are commonly utilized for this purpose.

In gyro installations where extreme accuracy and minimum drift are required, all spurious torques causing anomalous drift of the gyro must be reduced to a minimum. As torques applied to the system by flexible leads carrying power to the gyro are one of the main factors leading to gyro drift, the reduction of these particular torques is highly advantageous.

It is an object of the present invention to provide a flexible lead having a relatively large effective electrical cross section and a relatively low resistance to relative movement between the ends thereof.

It is another object of the present invention to provide a flexible power lead for gyro mountings, having a minimum tendency to impose undesirable torques on the gyro.

In broad terms, the present invention comprises a flexible lead composed of a plurality of fine threadlike wires positioned in substantially the same plane and close to each other. These wires are connected to bridge a bearing between two relatively moving members in such a manner that the wire strip as it may be called is slightly longer than the straight line between the end supports thereof and so that the movement is generally at a right angle to the general plane of the wires. Any desired electrical conductivity is obtained by the use of additional wires, not by increasing the cross section of individual wires. A preferred cross section for the individual wires making up the lead has been found to be between .001 and .002 inch. Such a lead has been found highly satisfactory for use with a precision gyro in which all anomalous torques have been reduced to a minimum.

The use of a plurality of fine wires connected in parallel has been found to provide a much lower torque in a normal installation than if a thin ribbon of metal were to be used in the same location, as it is not necessary when the fine wires are used, to mount the terminals thereof with the extreme accuracy that would be required if a ribbon were to be used to eliminate canting, twisting or buckling torques. These latter types of torques cannot exist in the fine wire arrangement.

The above and other advantages and objects of the invention will be more readily understood by reference to the drawings in which:

Figure 2 is a plan view of relatively rotating connector rings utilized in the gyro of Figure 1, taken as indicated by arrows 2 in Figure 3.

Figure 3 is an enlarged cross sectional view of the rings shown in Figure 2, taken as indicated by arrow 3 in Figure 1.

Figure 4 is an enlarged detailed view of a flexible lead.

Figure 1:
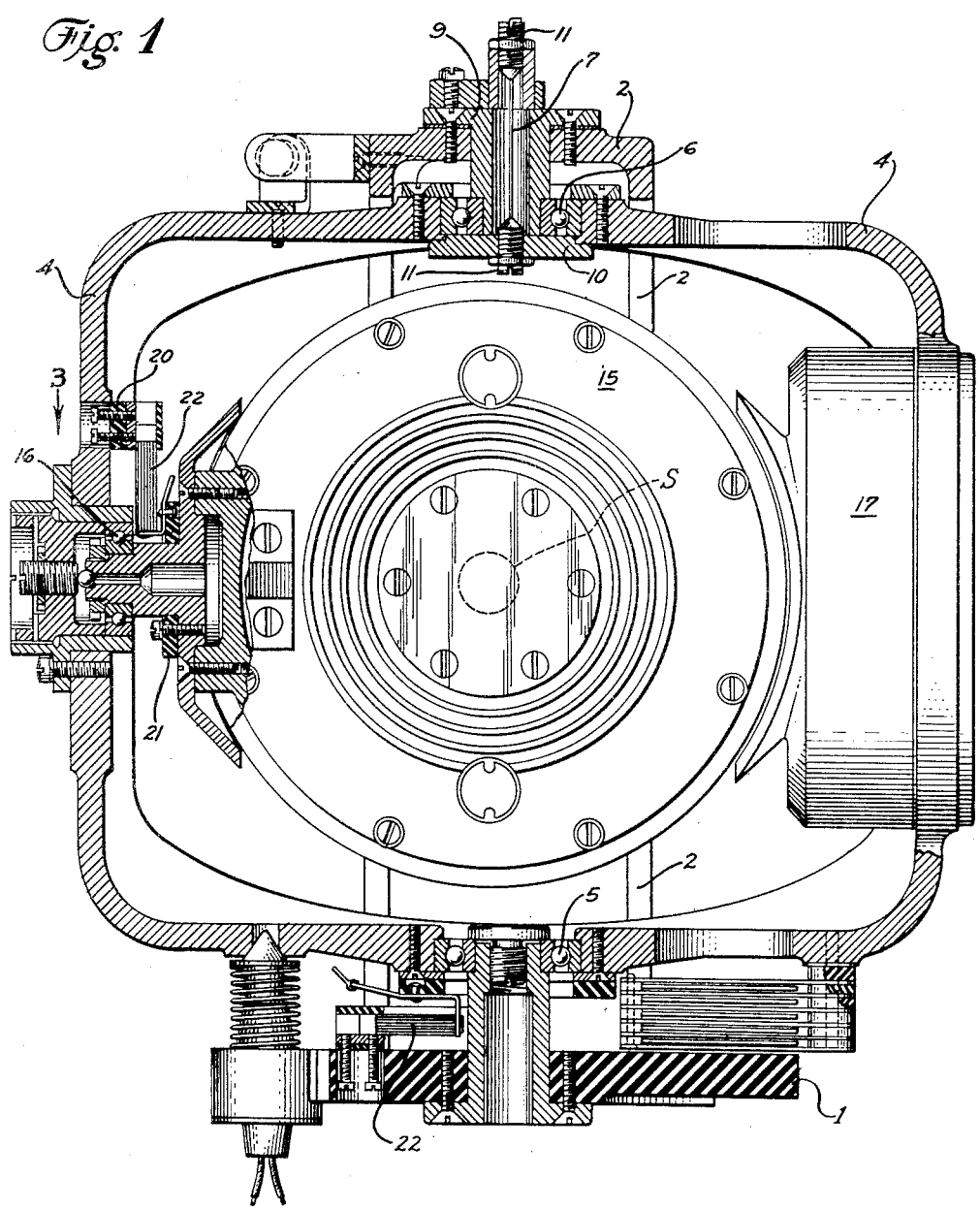
Figure 1 is a view partly in section and partly in elevation, of a gyro suspended in a gimbal, and embodying a preferred form of the present invention.

Referring to the drawings, a gyro base 1 is provided, this base having lateral arms 2 curving outwardly, upwardly and inwardly again to support a gimbal 4. Gimbal 4 is maintained in lateral position by a lower gimbal bearing 5 and an upper gimbal bearing 6, but is maintained in a vertical position primarily by a tension wire 7 attached at one end to the top 9 of lateral arms 2, and at the lower end to a gimbal plate 10 positioned immediately below upper gimbal bearing 6. The vertical position of the gimbal is adjusted by securing the ends of the tension wire 7 to threaded studs 11, that can be turned for vertical adjustment, and also for determination of the rest position of the gimbal in the vertical plane. The length of the tension wire assembly is adjusted so that substantially all of the weight of the gimbal and devices supported by it, will be taken by wire 7 and not by either of the bearings 5 or 6.

Mounted to rotate horizontally on gimbal 4 is a gyro case 15 containing an electric motor (not shown) having a relatively heavy rotor. The shaft position of the gyro motor is indicated by the letter S. The gyro case 15 rotates in case bearings 16, only the left hand bearing being shown, the right hand bearing being inside a torquer motor case 17, which contains an electric motor, used to rotate the case 15 on its bearings 16.

As both the gyro motor in case 15 and the torquer motor in case 17 will require power leads for their energization, and as such leads will have to cross one or more bearings, these leads must have sufficient electrical cross section to carry the required power, but at the same time must be sufficiently flexible to avoid imposing any substantial torque on the gyro. In consequence, a special type of lead is utilized to carry power around the lower gimbal bearing 5 and around the left hand case bearing 16. As the type of lead used in both instances is substantially the same, only the leads across case bearing 16 will be fully described, as best shown in Figures 2 and 3. A detailed view of one of the leads across gimbal bearing 5 is included in Figure 4.

Referring first to Figures 2 and 3, an outer connection sector 20 is attached to gimbal 4 and an inner connection ring 21 is attached to gyro case 15, these two connection elements being concentric with the axis of rotation of gyro case 15 and are made of insulating material.

Bridging the gap between sector 20 and ring 21 are a plurality of flexible leads 22. In the particular device shown, four leads are used. Three of these leads are power leads for the gyro motor, one of these leads is for a case position contact, described later.

As all of the flexible leads are alike, only one will be described. The lead itself is composed of a plurality of fine wires, preferably copper, inserted at each end thereof into terminals so that these wires are close together, parallel and coplanar when extended to their full length.

The wires at one end are inserted into a slot 25 as best shown in Figure 4, in a terminal block 26 and soldered. In case enameled copper wire is used, as is preferred, the enamel is removed only in the soldered area. The wires are then placed under a slight uniform tension and passed through a second slot 27 in a clip 29, bent 90°, and soldered to the back of the clip, as indicated in Figure 4.

The clips 29 are riveted to the ring 21, and the end of the clip opposite the wire insertion will serve as a connector to which wires to the motor etc. can be soldered or otherwise fastened.

The terminal blocks are then inserted in bushings 30 in sector 20 and held in place by terminal screws 31.

When the terminal blocks 26 are mounted in bushings 30, the bushings are positioned to be in the same radial line as the clip at a predetermined gyro position so that if the wires in leads 22 were to be extended to their full length, they would all be in a radial line. However, before the terminal blocks are tightened in place, they are moved inwardly to place a slight bow in the wires, as shown in Figure 2. This bowing permits relative movement of the sector and ring over a relatively large arc without tensioning the wires. However, only a very small arc of rotation is normally utilized, just sufficient for actuation of a sensing device.

Departure of the gyro case from its predetermined position with respect to the gimbal is sensed by a case contact mentioned above, comprising a roller 35 attached to a ring arm 36. At the predetermined gyro position the roller is between two sector contacts 37 but rotation of the gyro case on its bearings 16 will cause one or the other of the sector contacts to be electrically connected to the roller. One of the flexible lead clips 29 is connected to the ring arm 36 so that all three contacts of the gyro case position indicator as just above described will be connected to the gimbal 4. Thus there will be nine flexible leads used to cross bearing 5 between the gimbal 4 and the base 1: three for the gyro motor; three for the torquer motor; and, three for the case position indicator. In all instances the flexible lead herein described and claimed has been found eminently satisfactory. The lead wires form an effective beam with a minimum moment of inertia with respect to the axis of rotation, and thus any relative rotative displacement of the ring and sector will result in a minimum torque about the axis of rotation.

As a specific example of a flexible lead that has proved satisfactory in gyro service, a lead comprising twelve No. 44 (.00198 in. diam.) enamelled soft copper wires have been found to provide satisfactory current carrying capacity for a gyro motor 4 inches in diameter and to provide negligible torque even when a plurality thereof are used across the same bearing.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. A minimum torque, power lead between two coaxial members relatively rotatable to a limited extent comprising a plurality of adjacent, spaced, alined and parallel fine individually solid conductive wires of equal cross section and length, and means for fastening the respective ends of said wires to respective of said members with the general plane of said wires at right angles to the direction of movement of said members.

2. A minimum torque, power lead between coaxial members relatively rotatable to a limited extent comprising a plurality of adjacent, spaced, alined and parallel fine individually solid conductive wires of equal cross section and length, and means for fastening the respective ends of said wires to respective of said members with the general plane of said wires at right angles to the direction of movement of said members and with the length of said wires slightly greater than the radial distance between said members to provide a bow in said wires in equal amount and in the same direction.

3. Apparatus in accordance with claim 2 wherein the diameter of each of said wires is on the order of from .001 to .002 inch, and wherein the number of said wires to be used in said lead shall be determined by the current carrying requirements of said lead.

4. Apparatus in accordance with claim 2 wherein the diameter of each of said wires is on the order of from .001 to .002 inch and wherein the number of said wires to be used in said lead shall be determined by the current carrying requirements of said lead, and wherein said wires are enamelled copper.

References Cited in the file of this patent

UNITED STATES PATENTS

| 345,336 | Thomson | July 13, 1886 |
| 908,483 | Mug | Jan. 5, 1909 |
| 1,633,912 | Vawter | June 28, 1927 |
| 2,292,124 | Hynes | Aug. 4, 1942 |

FOREIGN PATENTS

| 737,848 | France | Dec. 16, 1932 |